United States Patent [19]

Tanaka et al.

[11] 3,936,184

[45] Feb. 3, 1976

[54] ELECTROPHOTOGRAPHIC COPYING MACHINE

[75] Inventors: Keiji Tanaka, Kawasaki; Yujiro Ando, Yokohama; Katsunobu Ohara, Kawasaki, all of Japan

[73] Assignee: Canon Kabushiki Kaisha, Tokyo, Japan

[22] Filed: May 21, 1974

[21] Appl. No.: 471,916

[30] Foreign Application Priority Data

| | | |
|---|---|---|
| July 9, 1973 | Japan | 48-77272 |
| Nov. 9, 1973 | Japan | 48-126039 |
| May 25, 1973 | Japan | 48-58903 |

[52] U.S. Cl. .................... 355/15; 250/325; 317/2 R; 317/4; 355/30

[51] Int. Cl.² ................G03G 21/00; G03B 27/52; H05F 3/00; H01T 19/04

[58] Field of Search ............ 355/30, 15; 317/2 R, 4; 250/325

[56] References Cited

UNITED STATES PATENTS

| | | | |
|---|---|---|---|
| 3,471,695 | 10/1969 | Hudson | 317/4 |
| 3,566,110 | 2/1971 | Gillespie et al. | 250/325 |
| 3,668,008 | 6/1972 | Severynse | 355/15 X |
| 3,741,157 | 6/1973 | Krause | 355/15 X |
| 3,743,540 | 7/1973 | Hudson | 355/15 X |
| 3,794,839 | 2/1974 | Hayne | 317/4 X |

*Primary Examiner*—Richard A. Wintercorn
*Attorney, Agent, or Firm*—Fitzpatrick, Cella, Harper & Scinto

[57] ABSTRACT

In an electrophotographic copying machine of the type which transfer an electrostatic latent image formed on a photosensitive element, usually comprising a conductive base and a photoconductive layer thereon, onto a recording member, an electric dust collector is provided to clean the air flowing in the vicinity of a corona discharger and the photosensitive member. In order to direct the dust-free air, there is provided an air flow passage and a blower such as a fan. The corona discharger and the electric dust collector may be constructed integrally or separately. All of the air in the copying machine may be made dust-free.

10 Claims, 21 Drawing Figures

ELECTROPHOTOGRAPHIC COPYING MACHINE

BACKGROUND OF THE INVENTION

1. Field of the Invention

The present invention relates to electrophotographic copying machines, and, in particular, to electrophotographic wherein dust and the like foreign matter are prevented from adhering to the component elements.

2. Description of the Prior Art

Among the various types of electrophotographic copying machines, there is a system where an electrostatic latent image is formed on a photosensitive member comprising a conductive layer and a photoconductive layer, and then the electrostatic latent image is transferred onto a recording member such as electrostatic recording paper, followed by the step of developing the recording member, as in the case when the T.E.S.I. method is employed. In copying machines of the electrostatic latent image transferring type as above mentioned, the surface of the photosensitive member is not subjected to development, which is different from copying machines utilizing the xerographic method, wherein charging, exposure and developing are carried out on the photosensitive member and then the developed image is transferred onto a recording member. On the other hand, as in the case employing the ion flow modulating method, there is another system in which use is made of an ion flow modulating grid (hereinafter refered to as "photosensitive screen") comprising a conductive layer and a photoconductive layer and provided with a number of fine pores, whereby an electrostatic latent image is formed on the photosensitive screen and then another latent image in accordance with the image on the screen is formed on a recording member, positioned apart from the screen. The recording member bearing thereon as thus formed an electrostatic latent image based on the above-mentioned ion flow modulating method, is subsequently subjected to development. In either of these systems, since there is no need to use cleaning materials such as for removing excessive toner on the surface of a photosensitive member or photosesitive screen having an electrostatic latent image formed thereon, especially in the case of the system employing the ion flow modulating method where it is unnecessary to contact the recording member is, there exists no chance that the photosensitive surface undergoes machanical damage and, therefore, it is expected that the photosensitive surface can be presented for use for a long period of time under a stable condition.

However, if such a photosensitive member or photosensitive screen having an electrostatic latent image formed thereon as above mentioned, has been subjected to a corona discharge for a long period of time, differences in the surface condition occur. It often occurs that it becomes virtually impossible to form an electrostatic latent image on such a surface. The reason for this is that dust-state, fine particles of 0.1 to 50 u, predominantly consisting of oxidized silicone drifting in the air, come to bear charges due to corona ions and adhere to the surface of the photosensitive member and the screen, causing a decrease in the surface resistivity of the photosensitive member. This phenomenon has been determined empirically. If use is made of a photosensitive member, the surface resistivity of which has decreased as above described, it is no longer possible to charge the surface of the photosensitive member to a sufficient degree and the contrast of an image reproduced deteriorates. Moreover, if this phenomenon of decreasing the surface resistivity of the photosensitive member continues, it comes to be impossible to obtain a reproduced image, which is endurable in practical use. Particularly, in case of the above-mentioned photosensitive screen having numerous pores, it is difficult to apply cleaning means for removing dust from the surface thereof. In the xerographic system, no such problem as the accumulation of dust on the photosensitive member occurs because developing and cleaning are carried out on the surface of the photosensitive member.

SUMMARY OF THE INVENTION

Accordingly, it is an object of the present invention to provide an electrophotographic copying machine, which is free from the adherence of dust or the like foreign matter on the component elements.

It is another object of the present invention to provide a photosensitive element for use in an electrophotographic copying machine, which is free from the adherence of dust or the like foreign matter.

It is still another object of the present invention to fill an electrophotographic copying machine with air having no dust and the like foreign matter.

It is still another object of the present invention to provide an electrophotographic copying machine incorporating suitable dust collecting means, which are compact in size and excellent in efficiency.

It is still another object of the present invention to provide a photosensitive element for use in electrophotographic copying machines, which is free from the accumulation of dust and the like foreign matter thereon, without the necessity of cleaning the same.

It is still another object of the present invention to provide an electrophotographic copying machine which overcomes the above-noted conventional drawbacks and is capable of obtaining an excellent image for a long period of time.

The above-mentioned objects of the present invention are attained by an electrophotographic copying machine which will be described hereinbelow. We summarize at the outset, as follows:

A photosensitive element, used in an electrophotographic copying machine of the present invention, is used by having an image-wise electrostatic latent image formed thereon. The thus formed electrostatic latent image is not developed, but is transferred onto a recording member. After transferring, the recording member is developed. In accordance with the present invention, there is proposed an electrophotographic copying machine provided with dust collecting means for preventing dust or the like foreign matter from adhering to the photosensitive element. The mounting location of such dust collecting means may be selected optionally if only it can prevent dust or the like foreign matter from adhering to the photosensitive element.

Various objects and advantages will become apparent from the following description.

BRIEF DESCRIPTION OF THE DRAWINGS

FIGS. 1 and 2 are schematic views showing an embodiment of the present invention wherein an electric dust collector is provided in the vicinity of a corona discharger, in which FIG. 1 is a perspective view thereof partly broken away and FIG. 2 is a cross-sectional view.

FIG. 10 is a perspective view, partly broken away, of an embodiment of a dust collector in which a conductive grid is provided in the air flow passage.

FIG. 11 is a perspective view, partly broken away, of an embodiment of a dust collector in which a corona discharging wire and a filter are provided along the passage of the air flow.

FIG. 12 is a perspective view, partly broken away, of an embodiment of a dust collector in which conductive grids are provided along the passage of the air flow.

FIG. 13 is a cross-sectional view of the dusts collector shown in FIG. 12.

FIG. 14 is a schematic cross-sectional view of a modification of the dust collector shown in FIG. 12.

FIG. 15 is a perspective view, partly broken away, showing a structure forming a part of the air flow passage with the use of continual wave-form conductive members.

FIG. 16 is a cross-sectional view of the structure shown in FIG. 15.

FIG. 17 is a perspective view, partly broken away, showing a structure forming a part of the air flow passage with the use of continuous wave-form conductive members.

FIGS. 18 and 19 are diagramatic views illustrating the operation of the dust collector shown in FIG. 17.

FIG. 20 is a perspective view, partly broken away, showing an embodiment of a dust collector where use is made of needle electrodes in place of the discharging wire employed in the dust collector shown in FIG. 12.

DETAILED DESCRIPTION OF THE PREFERRED EMBODIMENTS

Figure 1:
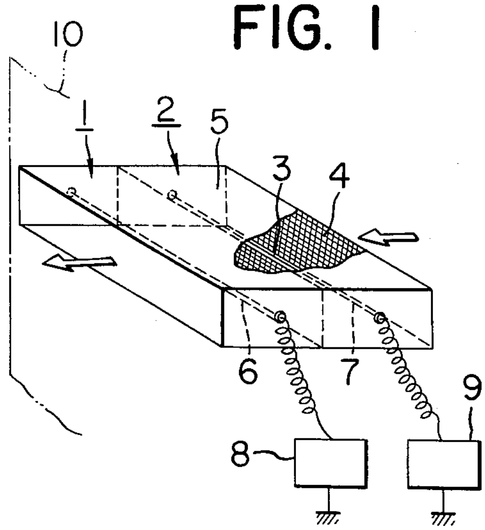

For a better understanding of this invention, together with other further objects thereof, reference is now made to the following description, taken in connection with the accompanying drawings. The scope of the invention will be pointed out in the appended claims. It is at the time when a corona discharge is applied to a photosensitive element, such as a photosensitive member and a photosensitive screen, that dust and the like foreign matter easily adheres to the photosensitive element. As a means to remove the dust that easily adheres to a photosensitive element by a corona discharge, it is most advantageous to us an electric dust collector utilizing a corona discharge. Referring to FIG. 1, there is schematically shown the structure of an embodiment of the present invention wherein an electric dust collector is provided in the vicinity of a corona discharger, for directing a corona discharge onto a photosensitive element, in which 1 designates a corona discharger of the conventional type, 6 a discharging wire and 8 a voltage source thereof. There are provided an electric dust collector 2 utilizing a corona discharge, a discharging wire 7 thereof and a voltage source 9 thereof. Elements 1 and 2 are housed in a metallic case 5. The air intake side of the electric dust collector 2 and the air discharge side facing the corona discharger 1 are closed with conductive grids 3, 4 such as a metallic net, respectively. The arrow indicates the direction of air flow, whereby use may be made of an ion flow produced by a fan exteriorly provided or a corona discharge.

In the above described structure, air first enters the electric the dust collector 2 and dust existing in the air flow comes to bear charges due to corona ions produced by the discharging wire. The dust then adheres to the walls of the electric dust collector whereby the air is cleaned. Thereafter, the cleaned air enters the corona discharger 1 and functions to carry corona ions produced by the discharging wire toward a photosensitive element 10. Accordingly, dust in the air is prevented from electrostatically adhering to the photosensitive element 10 and the above mentioned object is thus attained. That is, the period of using the photosensitive element 10 is substantially increased.

Figure 2:
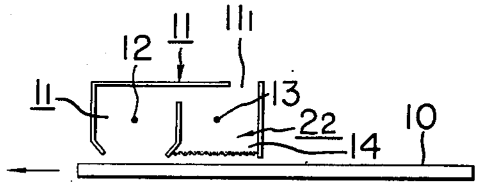

FIG. 2 shows another embodiment of the present invention. A photosensitive element $10_1$ moves under a corona discharger 11 and is charged by a corona discharge from a discharging wire 12. A discharging wire 13 is provided for dust collection and a corona discharge toward a conductive grid 14 causes an air flow whereby air is sucked through an opening $11_1$. If the conductive grid 14 is grounded, the photosensitive element $10_1$ is not charged. A voltage applied to the discharging wire 13 may be any polarity, D.C. or A.C., and the dust collecting ability is approximately proportional to the value of the current. With such a structure, the corona discharge generating area where the photosensitive element $10_1$ is charged, is filled with cleaned air, and the same effect can be attained as in the beforementioned embodiment. It will be understood that, in FIG. 2, $1_1$, designates a corona discharger and $2_2$ an electric dust collector.

In both of the embodiments described above, a corona discharger and an electric dust collector are provided in a single case. However, depending on the configuration of the electrophotographic copying machine and the like, they may be provided separately and, in this case, they are connected to each other with a connecting member such as a pipe. Moreover, with a view to increasing dust collecting efficiency, well known devices, such as a filter composed of glass wool, cloth or the like, may be employed together with an electric dust collector utilizing a corona discharge. Furthermore, for the purpose of removing dust and the like foreign matter adhering to the walls of the electric dust collector, it is possible to impart vibration or hammer shock to the walls.

Figure 3:
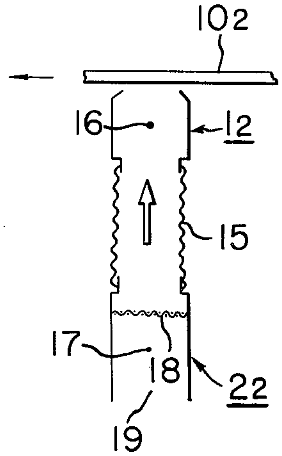
FIGS. 3 to 5 are schematic cross-sectional views showing an embodiment of the present invention wherein a corona discharger and an electric dust collector are connected with a connecting member.

FIG. 3 shows an embodiment wherein a corona discharger $1_2$ of the same kind as the conventional one shown in FIG. 1 and an electric dust collector $2_2$ utilizing a corona discharge are connected with a connecting member 15 such as a flexible pipe. A photosensitive element $10_2$ moves under the corona discharger $1_2$ and it is charged by means of a corona discharge from a discharging wire 16. Another discharging wire 17 is provided for dust collecting purposes, whereby discharging toward a conductive grid 18 causes an air flow to suck air from an opening 19. The voltage applied to the discharging wire 17 is the same as in the case of the embodiment of FIG. 2. The cross-section of the connecting member 15 is preferably the same in configuration and/or area as those of the corona discharger 12 and the dust collector $2_2$ for purposes of decreasing resistivity against the air flow. In the device as shown in FIG. 3, it is possible to provide a corona discharger part and an electric dust collector part separately, which is advantageous in the arrangement of the component elements whole machine.

Figure 4:
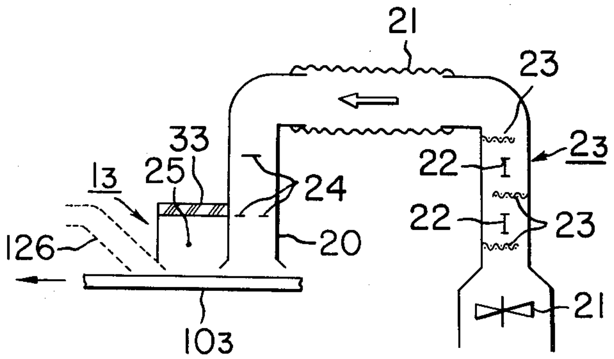

As distinguished from the above described embodiments, which are directed to make the air in the interior of a corona discharger dust-free, the embodiment shown in FIG. 4 is directed to make the air existing between and in the vicinity of a photosensitive element, such as a photosensitive member and a photosensitive screen and a corona discharger, dust-free. In the case where a corona discharger and a photosensitive element move relatively, as in FIG. 4, the air flowing into the spacing between the corona discharge electrode and the photosensitive element only occurs from one side of. In the present embodiment, considering the above phenomenon, it is structured to discharge the so cleaned air to one side of the corona discharger. In FIG. 4, there is provided a photosensitive element $10_3$, a corona discharger 13 of the conventional type as shown in FIG. 1, a corona discharging wire 25, and a duct member 20 disposed in the vicinity of the discharging wire, for cleaning the cleaned air. The duct member 20 is connected to an electric dust collector $2_3$ utilizing a corona discharge with a connecting member 21 such as a flexible pipe. First of all air is fed into the interior of the dust collector $2_3$ by a blower means 21 such as a fan. Dust in the air thus fed is charged by being subjected to a corona discharge from needle electrodes 22. Then the charged dust adheres to a conductive grid 23 and the walls of the dust collector 2. The conductive grid 23 charges the flow of air passing through the dust collector $2_3$ so as to enhance the dust removing performance. The air, deprived of dust as described above, passes through the connecting member 21 and reaches the duct member 20. In the duct member fins 24 are provided at several places. These fins are to impart a certain resistance to the air flow so as to eliminate the possibility of forming a local strong flow region and to discharge the cleaned air out of a discharge port, uniformly. As in FIGS. 2 and 4, it is also possible to use glass and the like at a shield plate portion opposite the opening side of the corona discharger so as to make it optically open. In such a corona discharger, discharging can be carried out simultaneously with the application of an image exposure and, at the same time, the photosensitive element is prevented from the adherence of dust thereto. In FIG. 4, there is shown a glass plate 33 provided in the corona discharger $1_3$. As shown with dotted lines, a suction duct 126 can be provided at the other side of the corona discharger $1_3$ so that the air sucked by the suction duct may advantageously be circulated into the electric dust collector $2_3$.

Figure 5:
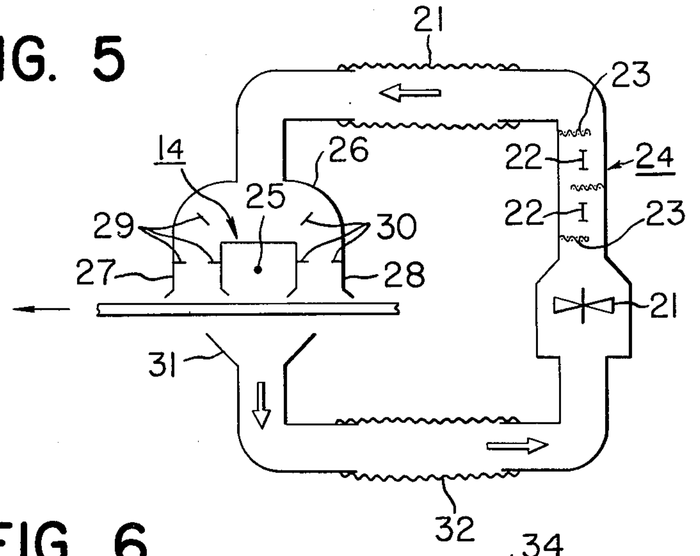

FIG. 5 shows another embodiment of discharging the cleaned air from the vicinity of the corona discharger as in the embodiment shown in FIG. 4. That is, FIG. 5 shows a structure wherein the cleaned air is discharged from both sides of the corona discharger $1_4$. There is provided a duct member 26 surrounding the corona discharger $1_4$. The duct member 26 is divided into duct members 27, 28 on both sides of the corona discharger $1_4$ in the vicinity of the photosensitive element $10_4$. In the duct members fins 29, 30 are provided in order to obtain the same effects as in the embodiment shown in FIG. 4. In addition to this, with the provision of an opening in the shield plate of the corona discharger $1_4$, the cleaned air may also be led toward the photosensitive element $10_3$ through the opening. In the case where a photosensitive element has a number of pores or openings as in a photosensitive screen, it is also advantageous from the view point of dust collecting effects to dispose a suction duct 31 below the photosensitive element $10_4$, as shown in FIG. 5, for circulating the cleaned air thus sucked to a blower means 21 via a connecting member 32. In this case, however, care should be taken not to suck the ambient air which is not cleaned by the suction duct 31 through the photosensitive screen.

In the embodiments shown in FIGS. 1 to 5, description was made of an example using a corona discharge in the electric dust collector 2 and using a discharging wire and needle elctrodes as a source of the corona discharge. It should, however, be noted that such description is not restrictive as any substitution may be made within the spirit of the present invention. That is, the use of discharging wire may be substituted for the needle electrodes and vice versa. Needless to say, any well known corona discharging means may be applicable in place thereof. Moreover, it would be no problem for a man skilled in the art to maintain the conductive walls and the conductive grid which constitute the housing of the electric dust collector 2, as shown in FIGS. 1 to 5, at an appropriate potential including a ground potential. Furthermore, as regards the voltage to be applied to the corona discharging wire of the dust collector 2, not only A.C. voltage and D.C. voltage in a broad sence, but also A.C. voltage superposed with D.C. voltage and even A.C. voltage having an asymmetrical negative and positive wave form, can be applied.

Figure 6:
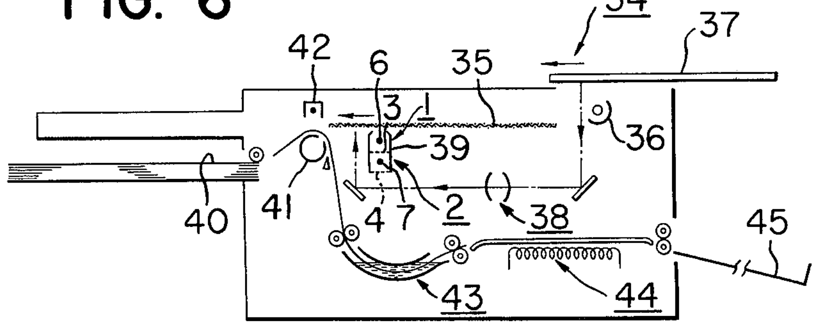
FIG. 6 is a schematic cross-sectional view showing an embodiment of the present invention wherein a device shown in FIG. 1 is applied to an electrophotographic copying machine employing a photosensitive screen.
Figure 7:
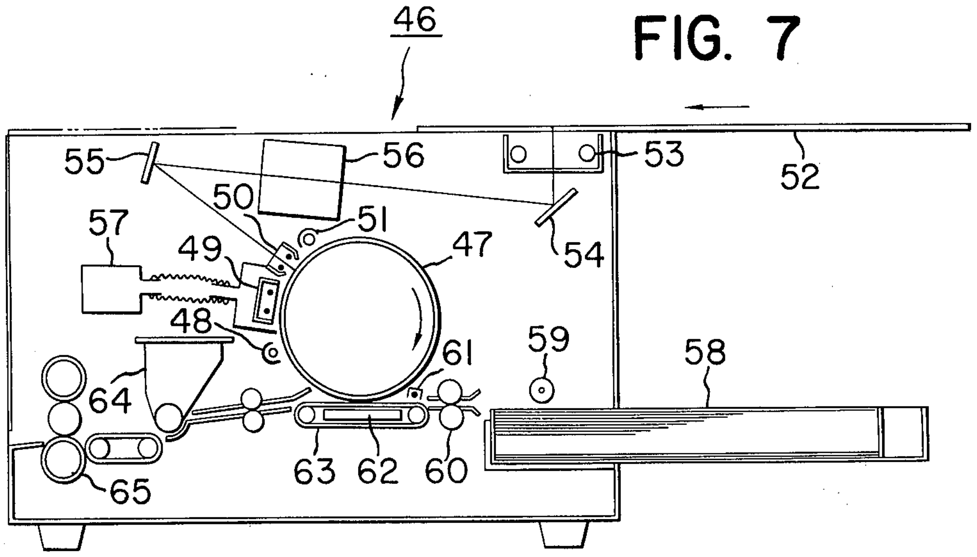
FIG. 7 is a schematic cross-sectional view showing a system wherein the present invention is applied to an electrophotographic copying machine employing the T.E.S.I. method.

Now reference will be made hereinbelow to an embodiment wherein the electric dust collector shown in FIGS. 1 and 4 is assembled in an actual electrophotographic copying machine. In FIG. 6, there is shown an electrophotographic copying machine 34 in which a photosensitive screen is used as a photosensitive element and a corona discharger of the type shown in FIG. 1 is used. In FIG. 7, there is shown an electrophotographic copying machine employing the T.E.S.I. method in which a usual photosensitive member is used and a corona discharger of the type shown in FIG. 4 is used. First, referring to FIG. 6, the photosensitive screen 35 comprises a conductive member having numerous fine pores and a photoconductive member provided on one side of the conductive member. As one example of manufacturing the photosensitive screen, on one side of a stainless screen of 200 mesh, woven with stainless fine wires, selenium is vapor-deposited, for example. The electrophotographic process utilizing such a photosensitive screen, as described above, is disclosed in the U.S. Pat. No. 3,645,614. In summary, the process comprises charging the photoconductive member of the photosensitive screen uniformly in a dark place and then exposing a light image to the photoconductive member to form an electrostatic latent image in compliance with the original image on the photosensitive screen. Thereafter, the other side of the photosensitive screen, remote from the exposed surface, is subjected to a corona discharge of opposite polarity to that of the former charging, thereby the corona ion flow due to this discharge is modulated to form an electrostatic latent image in compliance with the original image on a recording member positioned at a distance from the corona discharger, with the screen interposed therebetween. In the copying machine 34, applying the above described electrophotograhic method, an image of an original 37 to be reproduced, which is illuminated by a light source 36, is focused on a photosensitive screen 35 through a fixed optical system 38 comprising mirros, lenses and the like and the original 37 and the screen 35 move as indicated by the arrows, respectively. The photosensitive screen is firstly charged to a positive polarity by a corona discharger 39, integrating an electric dust collector 2 and a corona discharger 1 as a unit, and then exposed to image light to form an electrostatic latent image thereon. The photosensitive screen 35 after having been moved to the stopping position at the left, as viewed in FIG. 6, is now moved to the right and in synchronism therewith an electrostatic recording paper 40 is fed. The recording paper 40 is moved by a suction roller 41, approximately 2mm apart from the photosensitive screen 35, and a latent image corresponding to the latent image on the photosensitive screen 35 is formed on the recording paper by a positive corona discharge of the corona discharger 42. Then the recording paper 40 is developed by a developing device 43 and is discharged out to a tray 45 through a fixing treatment at a fixing device 44.

In comparative experiments between one case where 7KV A.C. was applied to the discharging wire 7 for dust collection of the corona discharger 39 shown in FIG. 1, in the copying machine 34, and 6KV D.C. was applied to the discharging wire 6 for charging, and the other case where use was made of a conventional corona discharger, the former underwent up to 100,000 repetitive operations, while in the latter case there was recognized remarkable deterioration in the images approximately after 10,000 repetitive operations. In both cases, use was made of a stainless net of 100 mesh for the metallic nets 3,4, corresponding to the conductive grids shown in detail in FIG. 1. When the photosensitive screen was wiped with a solvent such as methyl, ethyl and ketone, the image deterioration as described above was cured. It appears that the corona discharger 42 used to form an electrostatic latent image on a recording paper may be a usual corona discharger having no dust collecting means because no corona discharge is applied to the side of a conductive member.

FIG. 7 shows an electrophotographic copying machine 46 employing the T.E.S.I. method, in which a photosensitive member 47 is used therein and comprises three layers including a conductive support, a photoconductive layer and an insulating layer as disclosed in the U.S. Pat. No. 3,666,363. An electrostatic latent image is formed in accordance with the electrophotographic process as disclosed in this patent. In short, the process comprises a precharging step of the photosensitive member 47, a discharging step carried out simultaneously with the application of an image exposure and a uniform illumination step applied to the photosensitive member 47, through which an electrostatic latent image in compliance with an original image is formed on the photosensitive member 47. On the other hand, in the above described copying machine 46, the formation of a latent image on a drum-type photosensitive member 47 rotatable in the direction shown with the arrow is carried out by the application of a preexposure lamp 48, a corona discharger 49 for precharging, an A.C. corona discharger 50, with the simultaneous application of an image exposure and a uniform, illumination lamp 51. During image exposure, an original (not shown) placed on an original carriage 52 movable in the direction as indicated with the arrow, is illuminated by an illumination lamp 53, and an image is focused upon the photosensitive drum 47 through mirrors 54, 55 and a lens 56. Into the spacings between the corona discharger 49 for precharging, the A.C. corona discharger 50 and the photosensitive member 47, is supplied the air, after passing through the electric dust collector 57 described in detail in connection with FIG. 4. For this reason, during the period in which discharging is being effected to the photosensitive member 47, in the vicinity of each of the corona dischargers 49, 50 and the photosensitive member 47, cleaned air is supplied. Therefore, dust is prevented from adhering to the photosensitive member 47 due to the corona discharging. An electrostatic latent image thus formed on the photosensitive member 47 is transferred onto an electrostatic recording paper 58 in a manner as will be described hereinbelow. The electrostatic recording paper 58 is picked up by a pick up roller 59 and then transported synchronously with the movement of the latent image on the photosensitive member 47 by means of a timing roller 60. The recording paper 58 is then subjected to a corona discharge by means of the thereby discharger 61 to discharge the surface, and thereafter, it is transported in contact with the photosensitive member 47 by means of a suction device 62 and a belt 63 having a voltage applied thereto. During this period, the latent image on the photosensitive member 47 is transferred onto the recording paper. Then the recording paper is developed by a developing device 64, fixed by a heat roller fixing device 65, and discharged out of the copying machine.

If the electric dust collector 57 of the copying machine 46 is kept inoperative, there appears discernible deterioration in the reproduced image after having reproduced approximately 5,000 images. In contrast, by operating the electric dust collector 57, no discernible deterioration could be formed in the reproduced image after repeated reproduction of 30,000 images. It may will be easily understood that, since there exists additional dust, which falls due to the gravitational force and adheres to the photosensitive member, other than the dust which adheres to the photosensitive member due to the corona discharge, any well known machanical or electrical cleaning means can be applied to remove this dust.

Figure 8:
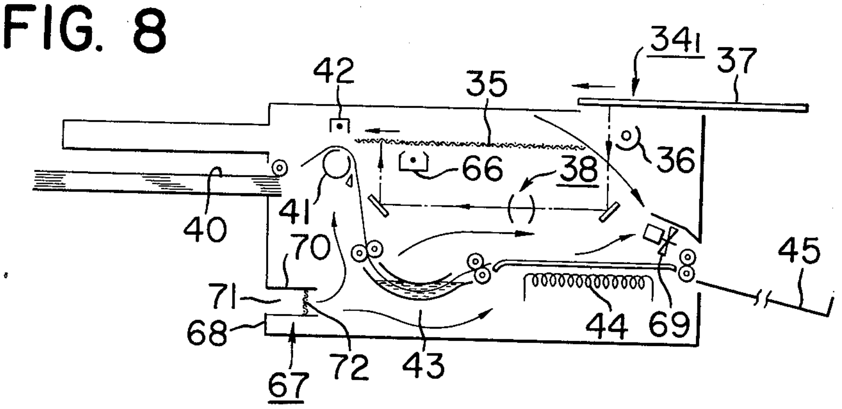
FIGS. 8 and 9 are schematic views showing an embodiment of the present invention wherein air with the dust removed is led into an electrophotographic copying machine.
Figure 9:
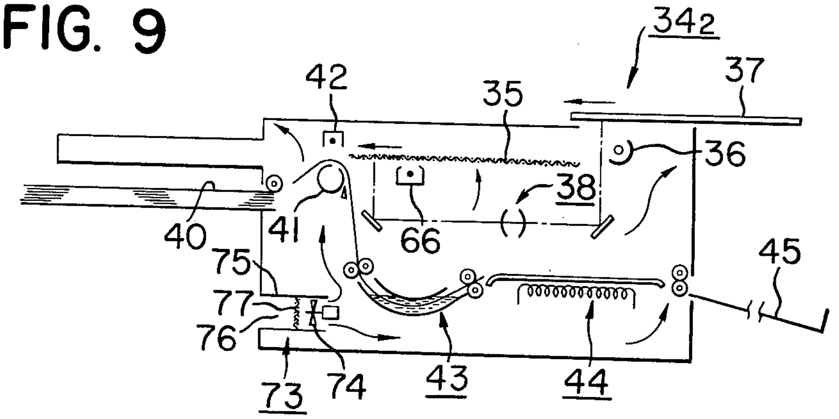

In the foregoing description, as regards FIGS. 6 and 7, there were disclosed electrophotographic copying machines 34, 36 having a structure especially provided for cleaning the air existing in the inside of and in the vicinity of the shield plate of the corona dischargers disposed in the proximity of the photosensitive member. On the other hand, another embodiment which will be described hereinbelow, is purported to maintain all of the air in an electrophotographic copying machine in a dust-free condition with the use of such an electric dust collector as described above. As the electrophotographic copying device, as a whole used in this embodiment is the same as that of FIG. 6, the operational description is omitted herein. In FIGS. 8 and 9, the corona discharger 66 has no electric dust collector as a unit, as distinguished from the corona discharger 39 of FIG. 6, and like numerals refer to like elements as in FIG. 6. In the copying device 34, shown in FIG. 8, an electric dust collector 67 is disposed at an opening portion provided in a housing 68 of the copying machine. In addition, as a discharging port for the recording paper, a blower means 69, such as a fan for blowing the air toward the exterior, is provided at the opening portion previously provided in the housing 68. An electric dust collector 67 comprises, a metallic case 70, a discharging wire 71 and a metallic net 72, wherein a suitable voltage is applied to the case 70. When the copying machine is rendered operative, the blower means starts to operate and the air is directed into the copying machine 34, as indicated by the arrows, through the electric dust collector 67. Therefore, the corona discharge is effected toward the photosensitive screen 35 in the air thus cleaned so that no dust adheres to the screen 35. It should be appreciated that this embodiment is also applicable to an electrophotographic copying machine employing the T.E.S.I. method, as in FIG. 7.

FIG. 9 shows another embodiment, which is a further improvement of the device shown in FIG. 8. In the device of FIG. 8, there is a possibility that non-cleaned air may sneak into the copying machine through clearances and openings other than the opening provided for the electric dust collector 70. The further improvement of a device $34_2$ shown in FIG. 9 is, to overcome this problem, that is to maintain the gas pressure of the cleaned air higher than that of the air outside of the device. In the copying machine $34_2$ of FIG. 9, there is provided an opening in the housing 68 and an electric dust collector 73 is disposed at the opening. The electric dust collector 73 comprises a dust collecting portion and a blower means portion 74, such as a fan, which operates to suck air into the interior of the copying machine. The dust collecting portion of the dust collector 73 comprises a metallic case 75 to which is applied a suitable voltage, a discharging wire 76 and a metallic net 77. When the copying machine is rendered operative, the dust collecting portion and the blower means portion are also made operative to fill the interior of the copying machine $34_2$ by the cleaned air as indicated with arrows. In this case, since the interior of the copying machine 34 is maintained at a higher gas pressure than the outside, there is no chance that non-cleaned air surrounding the copying machine may flow into it without being cleaned. Under these conditions, discharging is carried out onto the screen 35 so that the screen 35 is prevented from having dust adhere thereto. In either the case of FIG. 8 or the case of FIG. 9, an opening, already provided in the housing of the copying machine, can be used as a place to dispose the electric dust collector and the blower means. In addition, the embodiment shown in FIG. 9 is also applicable to an electrophotographic copying machine employing the T.E.S.I. method. It is to be noted that the invention is not limited to the electric dust collectors used in the copying machines of FIGS. 6 to 9. Other embodiments of electrid dust collector which will be described hereinbelow, are equally applicable to these copying machines if desired.

Figure 10:
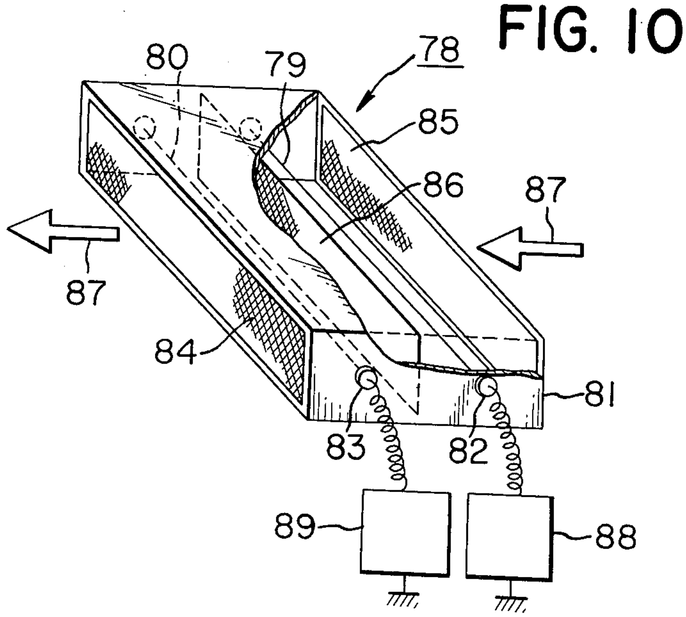
FIGS. 10 to 20 show several embodiments of an electric dust collector, in accordance with the present invention.

Now, reference will be made to several embodiments of electric dust collectors which are most suitable for use in an electrophotographic copying machine, referring to FIGS. 10 to 20 for explanatory purposes. A dust collector 78 shown in FIG. 10 is an electric dust collector utilizing a discharging wire. There are provided discharging wires 79, 80 which are mounted on a conductive case 81, for example a metallic case, to which is applied a suitable voltage, including a ground level through insulating supports 82, 83. Air is made to flow through opening portions in the case 81, as indicated by the arrow 87, by means of a blower means (not shown). In the passage of this air flow, are provided conductive grids 84, 85, 86, such as a metallic net, electrically connected to the case 81 and the dust charged by corona ions produced from the discharging wires 79, 80 adhere to the conductive grids 84, 85, 86. As in the foregoing, only the dust-free air is fed into the copying machine. There are also provided high voltage sources 88, 89 for the discharging wires.

Figure 11:
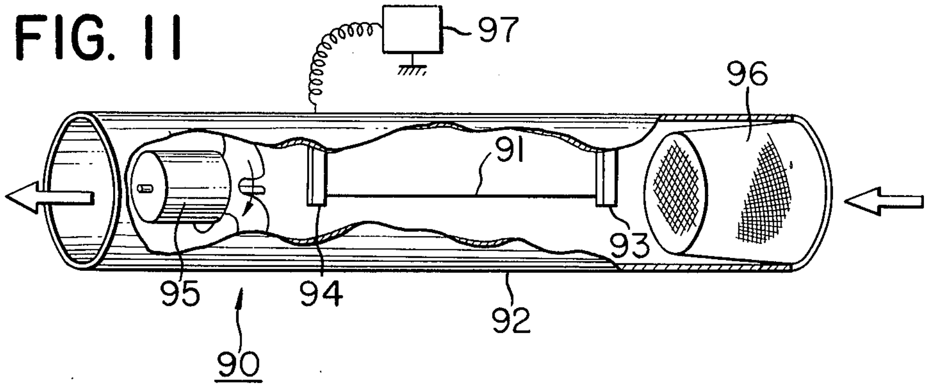

Another embodiment of a dust collector, shown in FIG. 11, is also an electric dust collector 90, utilizing a corona discharging wire. In FIG. 11, 91 designates a discharging wire which is mounted on a conductive case 92, such as a metallic cylinder, to which is applied a suitable voltage, including a ground level through insulating supports 93, 94. Air is made to flow through the interior of the dust collector 90 in the direction, as indicated by the arrows, by means of a blow means 95 such as a fan. In this case, dust in the air is roughly removed by a coarse mesh filter 96, employing cloth consisting of fabrics of a polyester family or cloth consisting of fabrics of a polyacrilonitrile family, disposed at the opening portion of the conductive case 92, whereby bigger dust particles of $1\mu$ or more are mostly removed. Fine dust particles passing through the filter 96 are charged by corona ions from the discharging wire 91 and therefore adhere to the conductive case 92. Meanwhile 97 designates a high voltage source for the discharging wire.

Figure 12:
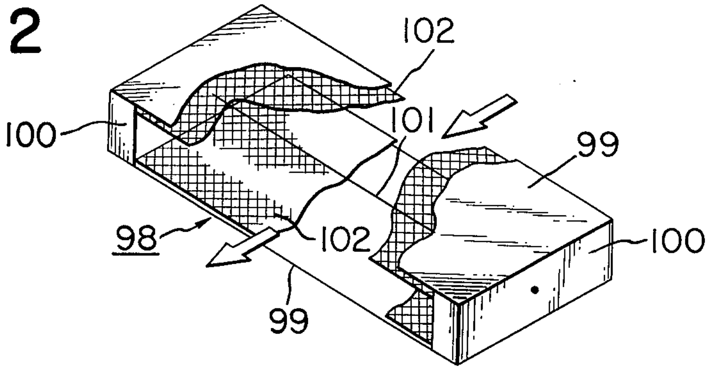
Figure 13:
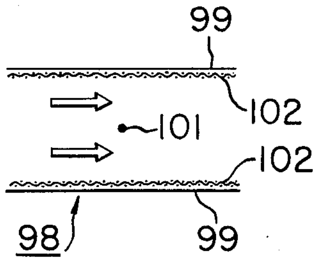

In another embodiment, shown in FIG. 12, an electric dust collector 98 comprises a grounded conductive member 99 of metal or the like, and an insulating member 100 of ceramics, or the like, supporting the member 99, which form an air flow passage. In this passage is provided a discharging wire 101 and a conductive grid 102, such as a metallic net extended, in contact with the conductive member 99, in the same direction as that of the air flow between the wire 101 and the conductive member 99. Same the area of a wall surface increases effectively by the use of the conductive grid 102, it becomes possible to maintain a high dust collecting efficiency for a long period of time. A conductive cloth may be provided in place of the metallic net as a conductive grid, but a conductive member having pointed ends tends to decrease the dust collecting efficiency becasue inverse electric dissociation occurs at the pointed ends. FIG. 13 shows the cross-sectional surface of the dust collector 98 of FIG. 12. The conductive grid 102 may be directly grounded without being connected to the conductive member 99.

Figure 14:
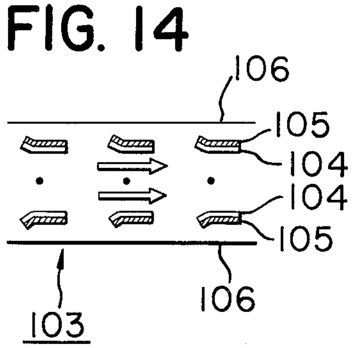

FIG. 14 discloses another embodiment of an electric dust collector 103, wherein one side surface of the conductive grid 102 of the dust collector 98 is formed with an insulator 104 and the other surface is formed with a grounded conductor 105 and the arrangement is made in such a way that the insulator faces a discharging wire 107. FIG. 14 shows a cross-sectional surface of the dust collector having the above described structure. In the case of this dust collector, corona discharging is effected toward the outer conductive member 106 forming an air flow passage. For this reason, the charged dust adheres to the conductive member 106 and the conductor 105 so that it is possible to prevent dispersion of the dust due to the air flow.

Figure 15:
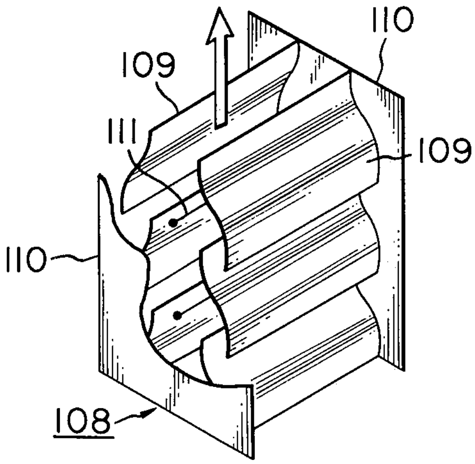
Figure 16:
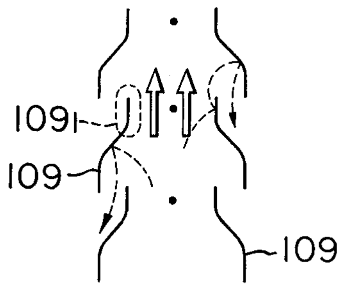
Figure 17:
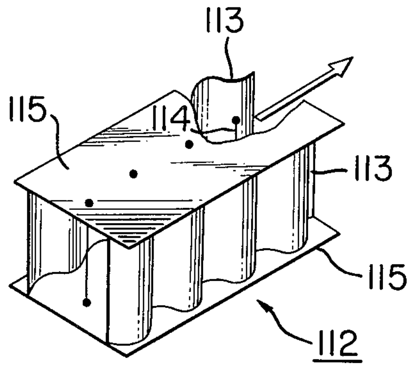
Figure 18:
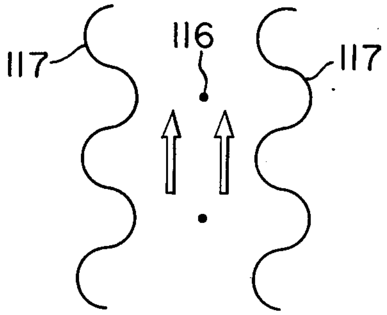
Figure 19:
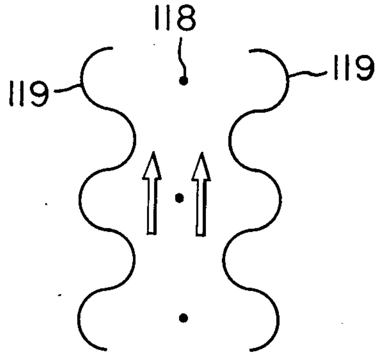

In the embodiment of the electric dust collector 108 shown in FIG. 15, there are provided conductive members 109, which for example are continual wave-form grounded metallic plates, and insulating members 110 support the conductive members 109 to form an air flow passage. In the passage are provided discharging wires 111 and the charged dust adheres to the conductive members 109 and falls. FIG. 16 shows a longitudinal cross-sectional surface of the embodiment shown in FIG. 15, in which the dust thus adhered, as described above, falls down deviating from the air flow passage, as indicated by the dotted lines. The dust, having adhered to an air flow passage side 109 of the conductive members, comes into the air flow when falling down so that is is again charged with a corona discharge and again adheres to the conductive members 109. By repeating this action, the dust is finally removed from the air flow passage. FIG. 17 shows another embodiment of an electric dust collector 112, wherein continuous wave-form members are substituted for the continual wave-form conductive members 109 of the before-mentioned dust collector 108. These wave-form conductive members 113, which are grounded, have a height of approximately 10mm from top to bottom and a pitch of approximately 20mm between waves. In the dust collector 112, since the direction of the wave is perpendicular to that of the air flow, the bottom portions of the waves are free from the influence of the air flow and, therefore, the dust to be removed falls down in the direction of the wave. In FIG. 17, 114 designates discharging wires, and 115 designates insulating members supporting the wire 114 and the conductive members 113. FIGS. 18 and 19 show the arrangement of the wave-form conductive members 113. In the case of the arrangement shown in FIG. 18, turbulence due to the air flow is less and the dust adhering to the bottom portions falls down without scattering. In FIGS. 18 and 19, discharging wires are designated by 116, 118 and wave-form conductive members by 117, 119.

Figure 20:
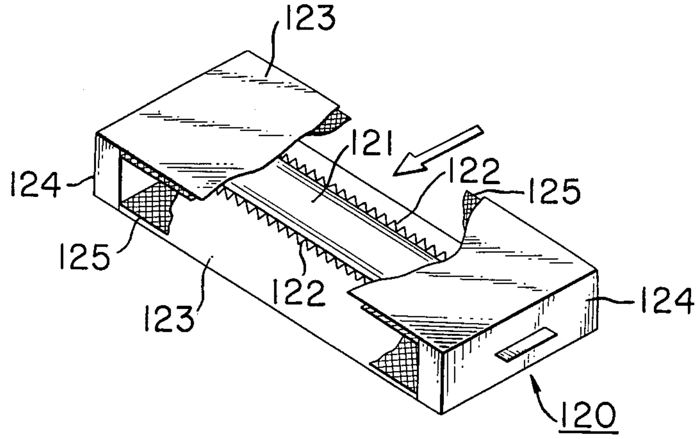

FIG. 20 shows another embodiment of an electric dust collector 120, wherein a needle discharging electrode 121 is used in place of the discharging wire of the dust collector 98 in FIG. 12. Needle portions 122 of the electrode 121 are formed by etching a stainless plate of 0.2mm thickness so as to form needles which are spaced a distance of 5mm apart and have an angle of 30°. In FIG. 20, 123 is a conductive member, 124 is an insulating member to support the member 123, and both of them form an air flow passage. In the passage, there are provided conductive grids 125.

Figure 21:
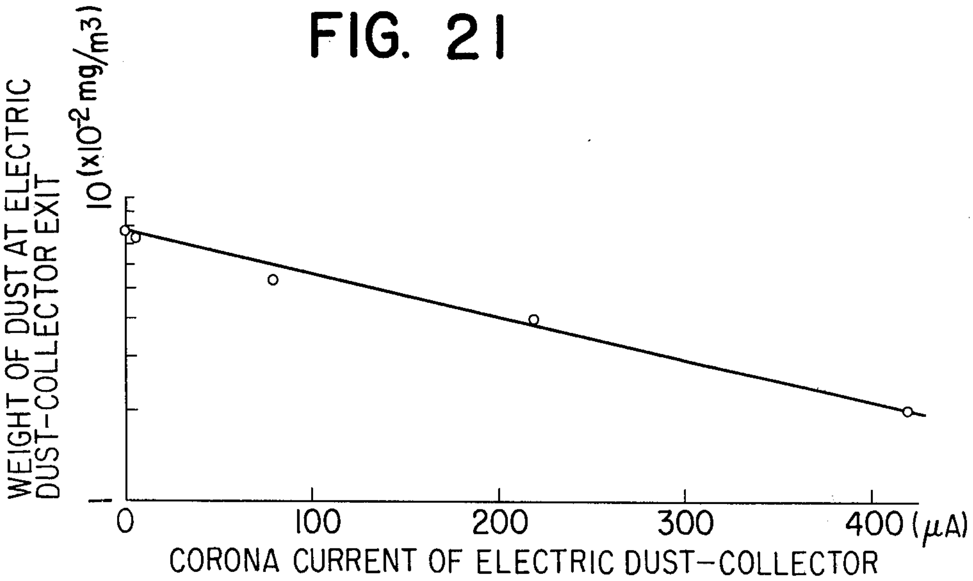
FIG. 21 is a graph showing the relationship between dust collecting efficiency and corona current.

FIG. 21 is a graph showing the relationship between the dust collecting efficiency $\eta$ and a corona current I, when the current is varied at the discharging electrode of the dust collector 120 with −7KV. It may will be understood from the graph that there is a relationship between $\eta$ and I as expressed by log $\eta \alpha$ I. In other words, the corona discharge of the dust collector has a considerable influence upon the increasing of the dust collecting efficiency $\eta$ by the current.

Now, when dust collection was carried out by passing an air flow through each of the dust collectors 98 and 120 with the rate of 1m/sec. while applying a voltage of −7KV and a corona current of 1.5mA to each of the discharging electrodes, the dust collecting efficiency by the discharging wire 101 in the dust collector 98 was about 80% and the dust collecting efficiency by the needle discharging electrode in the dust collector 120 was about 95%. It may thus be concluded that, in corona discharging for dust collection, the needle type is more advantageous than the wire type in terms of dust collecting efficiency, as well as durability.

As regards the voltage to be applied to an electrode, such as a discharging wire of the electric dust collectors 78 90, 98, 103, 108, 112, and 120 as described above, it may either be A.C. or D.C. If D.C. is used, it may either be negative or positive in polarity. Especially, in the case when a negative D.C. is used, shift from corona discharging to spark discharging is not easy to occur and a higher current can be obtained because the current is easier to take out in the case of negative D.C. It may be understood that a superposition of A.C. and D.C. and A.C. in a broad sense are also applicable to the present invention. As described above, to apply a high current to the electrode, such as a discharging wire, with a negative polarity, is more advantageous because the dust collecting efficiency can be increased.

In turn, reference will be made to the velocity of the air flow passing through the electric dust collector and the configuration of the air flow passage.

In order to increase the quantity of air flowing through an electric dust collector, it is necessary to increase the velocity of the air flow, but there is a maximum limit for such velocity. It requires a period of time for the dust which enters the electric dust collector together with the air flow to be charged by a corona discharge and adhere to the conductive wall portion, which is grounded or to which is applied a voltage. For this reason, if the velocity of the air flow increases too much, it may happen that the dust passes through the electric dust collector without adhering to the conductive wall portion and the dust, once adhered to the wall portion, is again stripped off. Therefore, the velocity of the air flow passing through the passage of an electric dust collector is suitable to be in the range of about 0.5–4m/sec. Moreover, when having dust adhere to a conductive net by a dust collector as described above, if the net is disposed perpendicular to the advancing direction of the air flow, the dust adhered to the net is easily scattered again and the net is plugged with the dust, thus increasing the wind pressure. In view of these reasons, it is preferable to dispose a member, having dust adhering thereto, approximately parallel to the advancing direction of the air flow, as shown in the above embodiments. Moreover, it becomes possible to carry out a more complete dust collection by arranging a plurality of such electric dust collectors in parallel or in series. As a method of collecting the dust adhered to the interior of a dust collector due to charging by a corona ion flow, it goes without saying that there may be provided a dust receiving means to receive the falling dust which falls due to the application of vibration to the dust collector.

While reference was made to an electric dust collector as the means for removing the dust in the air, it should be understood that a conventional dust collecting means, such as a filter, may be applicable in place of and in addition to the electric dust collector. In an electrophotographic copying machine, it is necessary to provide means for collecting fine dust particles of 1 $\mu$ or less.

Additionally, the following effects can be obtained by cleaning the air in the electrophotographic copying machine, as disclosed in FIGS. 8 and 9. That is, in a powder image transfer type copying machine employing a method such as a xerographic method, the dust which adhered to the photosensitive member is also existent in a the developing agent. Especially in copying machine wherein the developing agent remaining on the photosensitive member after transferring is collected and presented for reuse, the quantity of the dust existing in the developing agent becomes remarkable, and the dust so contained bears a charge opposite in polarity to that of the toner constituting the developing agent and, as a result, it may neutralize the toner. If an electrostatic latent image is developed with the use of such developing agent, there is formed numerous fogs in the reproduced image. In other words, such dust can be a cause of deteriorating a developing agent and bringing about the degrading of the image quality of the reproduced image. It will be understood that such disadvantages are overcome by cleaning the air in the copying machine.

While the present invention and its objects and advantages, as has been described herein, has been carried out in specific embodiments thereof, it is not desired to be limited thereby, but is intended to cover the invention broadly within the spirit and scope of the appended claims.

We claim:

1. An electrophotographic apparatus wherein an electrostatic latent image is formed with the utilization of at least means for applying voltage by corona discharge and illuminating means, comprising:

a photosensitive member;

means for charging said photosensitive member;

wall means for supplying a gas adjacent and between said charging means and said photosensitive member, said wall means being disposed along and adjacent said charging means; and dust removing means connected to said wall means.

2. An electrophotographic machine according to claim 1, wherein said dust removing means is a dust collector which is provided with blower means for supplying the gas which passes through said dust collector means to the area adjacent said charging means.

3. An electrophotographic apparatus wherein an electrostatic latent image is formed with the utilization of means for applying voltage by corona discharge and illuminating means, comprising:

a photosensitive member;

means for charging said photosensitive member;

first wall means for supplying a gas between said charging means and said photosensitive member;

second wall means for sucking the gas supplied by said first wall means; and dust removing means provided with blower means which is provided continuously to said first wall means.

4. An electrophotographic apparatus according to claim 3 wherein said first wall means and said second wall means are connected at the respective ends thereof, thereby circulating the gas within said first and second wall means.

5. An electrophotographic machine according to claim 3 wherein said dust removing means is a dust collector.

6. An electrophotographic apparatus wherein an electrostatic latent image is formed with the utilization of means for applying voltage by corona discharge and illuminating means, comprising:

a photosensitive member;

a dust collector provided with blower means for filling the area adjacent said photosensitive member with gas which has passed through said dust collector; and wall means for segregating said photosensitive member from ambient air.

7. An electrophotographic apparatus wherein an electrostatic latent image is formed with the utilization of means for applying voltage by corona discharge and illuminating means, comprising:

a photosensitive member;

dust removing means; and blower means;

said dust removing means and blower means being disposed in a casing for said means for forming an electrostatic latent image, and gas which has passed through said dust removing means being present adjacent said photosensitive member.

8. An electrophotographic machine according to claim 7 wherein said blower means is provided continuously to said dust removing means to maintain the pressure within the casing higher than ambient pressure.

9. An electrophotographic machine wherein an electrostatic latent image is formed with the utilization of means for applying voltage by corona discharge and illuminating means, comprising:

a photosensitive screen having numerous small openings, said photosensitive screen modifying ion flow to the pattern of an electrostatic latent image;

means for charging said photosensitive screen;

wall means for supplying a gas adjacent and between said charging means and said photosensitive material; and a dust collector connected to said wall means.

10. An electrophotographic machine wherein an electrostatic latent image is formed with the utilization of means for applying voltage by corona discharge and illuminating means, comprising:

a photosensitive screen having numerous small openings, said photosensitive screen modifying ion flow to the pattern of an electrostatic latent image;

a dust collector provided with blower means for filling the area adjacent said photosensitive screen with a dust free gas; and wall means for segregating said photosensitive screen from the ambient air.

* * * * *

UNITED STATES PATENT OFFICE
CERTIFICATE OF CORRECTION

Patent No. 3,936,184 Dated February 3, 1976

Inventor(s) KEIJI TANAKA, ET AL.

It is certified that error appears in the above-identified patent and that said Letters Patent are hereby corrected as shown below:

On the Title Page, in the Abstract, line 2, "transfer" should read --transfers--;

Column 1, lines 7 and 8, "electrophotographic wherein" should read --electrophotographic copying machines wherein--;

Column 2, line 4, "it comes to be impossible" should read --it becomes impossible--;

Column 3, line 30, "dusts" should read --dust--;

Column 3, line 66, "us" should read --use--;

Column 4, line 18, "electric the dust collector 2 and dust" should read --electric dust collector 2 and dust--;

Column 5, line 15, "elements whole machine" should read --elements for compacting the whole machine--;

Column 5, line 27, "side of" should read --side.--;

Column 6, line 41, "sence," should read --sense,--;

Column 7, line 16, "mirros" should read --mirrors--;

Column 8, line 35, "the thereby discharger 61" should read --the discharger 61--; "to" should read --to thereby--

Column 8, line 51, "will" should read --well--;

Column 9, line 49, "by the cleaned air" should read --with cleaned air--;

UNITED STATES PATENT OFFICE

CERTIFICATE OF CORRECTION

Patent No. 3,936,184 Dated February 3, 1976

Inventor(s) KEIJI TANAKA, ET AL.

It is certified that error appears in the above-identified patent and that said Letters Patent are hereby corrected as shown below:

Column 9, line 50, "with arrows" should read --by the arrows--;

Column 9, line 66, "electrid" should read --electric--;

Column 9, line 66, "collector" should read --collectors--;

Column 10, line 50, "Same" should read --Since--;

Column 10, line 57, "becasue" should read --because--;

Column 11, line 22, "is is" should read --it is--;

Column 11, line 61, "will" should read --well--;

Column 13, line 8, "a the" should read --the--;

Signed and Sealed this

*eleventh* Day of *May 1976*

[SEAL]

*Attest:*

RUTH C. MASON
*Attesting Officer*

C. MARSHALL DANN
*Commissioner of Patents and Trademarks*